US012737026B2

(12) United States Patent
Kirshenboim et al.

(10) Patent No.: US 12,737,026 B2
(45) **Date of Patent: *Sep. 15, 2026**

(54) ANALOG MAC AWARE DNN IMPROVEMENT

(71) Applicant: Microsoft Technology Licensing, LLC, Redmond, WA (US)

(72) Inventors: Gilad Kirshenboim, Petach Tiqva (IL); Ran Sahar, Evan Yehuda (IL); Douglas C. Burger, Bellevue, WA (US); Yehonathan Refael Kalim, Herzeliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/400,749

(22) Filed: Dec. 29, 2023

(65) Prior Publication Data

US 2024/0134439 A1 Apr. 25, 2024

Related U.S. Application Data

(63) Continuation of application No. 17/551,875, filed on Dec. 15, 2021, now Pat. No. 11,899,518.

(51) Int. Cl.
*G06F 1/3234* (2019.01)
*G06F 7/544* (2006.01)
(Continued)

(52) U.S. Cl.
CPC .......... *G06F 1/3234* (2013.01); *G06F 7/5443* (2013.01); *G06F 13/102* (2013.01); *G06N 3/02* (2013.01)

(58) Field of Classification Search
CPC .... G06F 1/3234; G06F 7/5443; G06F 13/102; G06N 3/02
See application file for complete search history.

(56) References Cited

U.S. PATENT DOCUMENTS

2020/0401206 A1* 12/2020 Kallam ................ G06F 7/5443
2021/0097131 A1* 4/2021 Guo ...................... H03M 1/466
(Continued)

FOREIGN PATENT DOCUMENTS

EP 2978266 A1 * 1/2016 .......... H04L 1/0005

OTHER PUBLICATIONS

Communication under Rule 71(3) EPC, Received or European Application No. 22801276.1, mailed on Jul. 17, 2026, 7 pages.

*Primary Examiner* — Nimesh G Patel
(74) *Attorney, Agent, or Firm* — Weaver IP L.L.C.

(57) ABSTRACT

Methods, systems and computer program products are provided for improving performance (e.g., reducing power consumption) of a hardware accelerator (e.g., neural processor) comprising hybrid or analog multiply and accumulate (MAC) processing elements (PEs). Selective variation of the precision of an array of MAC PEs may reduce power consumption of a neural processor. Power may be conserved by dynamically controlling the precision of analog to digital (ADC) output bits for one or more MAC PEs. Dynamic control of ADC output bit precision may be based on precision information determined during training and/or post-training (e.g., quantization) of an artificial intelligence (AI) neural network (NN) model implemented by the neural processor. Precision information may include a range of dynamic precision for each of a plurality of nodes of a computation graph for the AI NN model.

20 Claims, 6 Drawing Sheets

(51) Int. Cl.
*G06F 13/10* (2006.01)
*G06N 3/02* (2006.01)

(56) References Cited

U.S. PATENT DOCUMENTS

| | | | | |
|---|---|---|---|---|
| 2021/0303972 | A1* | 9/2021 | Lee | G06N 3/044 |
| 2022/0351761 | A1* | 11/2022 | Yang | H03M 1/468 |
| 2023/0083270 | A1* | 3/2023 | Agrawal | H03M 1/466 708/200 |

* cited by examiner

ANALOG MAC AWARE DNN IMPROVEMENT

CROSS-REFERENCE TO RELATED APPLICATION(S)

This application is a continuation of U.S. patent application Ser. No. 17/551,875, entitled "ANALOG MAC AWARE DNN IMPROVEMENT," and filed on Dec. 15, 2021, the entirety of which is incorporated by reference herein.

BACKGROUND

A neural processor may implement an artificial intelligence (AI) neural network (NN) model using a hardware accelerator with digital hybrid or analog multiply and accumulate (MAC) modules/circuits that consume significant amounts of power.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for improving performance of a hardware accelerator (e.g., a neural processor) comprising hybrid or analog multiply and accumulate (MAC) processing elements (PEs). Selective variation of the precision of an array of MAC PEs may reduce power consumption of a neural processor. Power may be conserved by dynamically controlling the precision of analog to digital converter (ADC) output bits for one or more MAC PEs. Power consumption may be reduced by selectively avoiding ADC cycles unnecessary for the level of precision of some computations. Dynamic control of ADC output bit precision may be based on precision information determined during training and/or post-training (e.g., quantization) of an artificial intelligence (AI) neural network (NN) model implemented by the neural processor. Precision information may include a range of dynamic precision for each of a plurality of nodes of a computation graph for the AI NN model.

Further features and advantages of the subject matter (e.g., examples) disclosed herein, as well as the structure and operation of various embodiments, are described in detail below with reference to the accompanying drawings. It is noted that the present subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
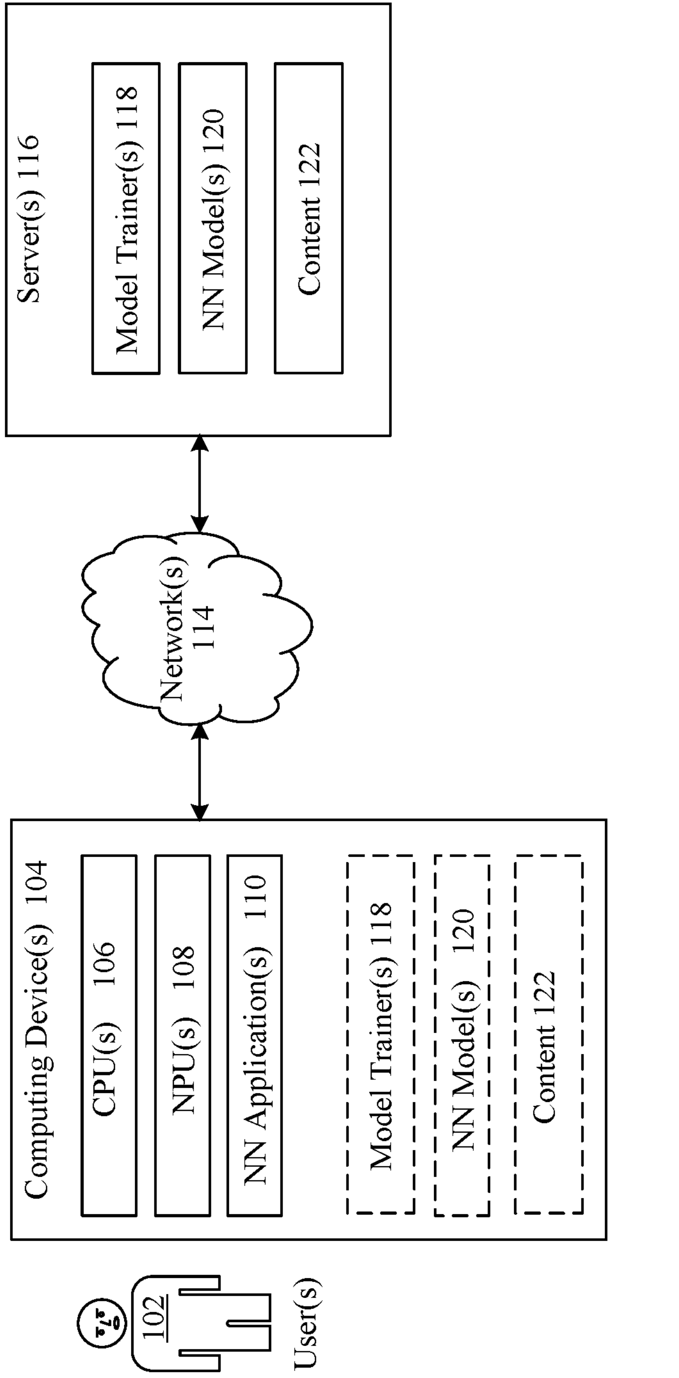
FIG. 1 shows a block diagram of a neural network (NN) training and inference computing environment, according to an example embodiment.

The features and advantages of the examples disclosed will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the various examples. The scope of the present subject matter is not limited to the disclosed embodiments. The disclosed embodiments merely exemplify the various examples, and modified versions of the disclosed embodiments are also encompassed by the present subject matter. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Methods, systems, and computer program products are provided for improving performance (e.g., reducing power consumption) of a hardware accelerator (e.g., a neural processing unit (NPU)) comprising hybrid or analog multiply and accumulate (MAC) processing elements (PEs). Selective variation of the precision of an array of MAC PEs may reduce power consumption of a neural processor. Power may be conserved by dynamically controlling the precision of the output bits of an analog to digital converter (ADC) for one or more MAC PEs. Power consumption may be reduced by selectively avoiding ADC cycles unnecessary for the level of precision of some computations. Dynamic control of ADC output bit precision may be based on precision information determined during training and/or post-training (e.g., quantization) of an artificial intelligence (AI) neural network (NN) model implemented by the neural processor. Precision information may include a range of dynamic precision for each of a plurality of nodes of a computation graph for the AI NN model.

Such embodiments may be implemented in various configurations. For instance, FIG. 1 shows a block diagram of an example neural network (NN) training and inference computing environment (referred to herein as "NN computing environment") 100 for improving performance (e.g., reducing power consumption) of a hardware accelerator (e.g., neural processor), according to an example embodiment. Example NN computing environment 100 may include, for example, one or more computing devices 104, one or more networks 114, and one or more servers 116. Example NN computing environment 100 presents one of many possible examples of computing environments. Example system 100 may comprise any number of computing devices and/or servers, such as example components illustrated in FIG. 1 and other additional or alternative devices not expressly illustrated.

Network(s) 114 may include, for example, one or more of any of a local area network (LAN), a wide area network (WAN), a personal area network (PAN), a combination of communication networks, such as the Internet, and/or a virtual network. In example implementations, computing device(s) 104 and server(s) 116 may be communicatively coupled via network(s) 114. In an implementation, any one or more of server(s) 116 and computing device(s) 104 may communicate via one or more application programming interfaces (APIs), and/or according to other interfaces and/or techniques. Server(s) 116 and/or computing device(s) 104 may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device(s) 104 may comprise computing devices utilized by one or more users (e.g., individual users, family users, enterprise users, governmental users, administrators, hackers, etc.) generally referenced as user(s) 102. Computing device(s) 104 may comprise one or more applications, operating systems, virtual machines (VMs), storage devices, etc., that may be executed, hosted, and/or stored therein or via one or more other computing devices via network(s) 114. In an example, computing device(s) 104 may access one or more server devices, such as server(s) 114, to provide information, request one or more services (e.g., content, model(s), model training) and/or receive one or more results (e.g., trained model(s)). Computing device(s) 104 may represent any number of computing devices and any number and type of groups (e.g., various users among multiple cloud service tenants). User(s) 102 may represent any number of persons authorized to access one or more computing resources. Computing device(s) 104 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 104 are not limited to physical machines, but may include other types of machines or nodes, such as a virtual machine, that are executed in physical machines. Computing device(s) 104 may each interface with authentication and authorization server(s) 118, for example, through APIs and/or by other mechanisms. Any number of program interfaces may coexist on computing device(s) 104. An example computing device with example features is presented in FIG. 6.

Computing device(s) 104 have respective computing environments. Computing device(s) 104 may execute one or more processes in their respective computing environments. A process is any type of executable (e.g., binary, program, application) that is being executed by a computing device. A computing environment may be any computing environment (e.g., any combination of hardware, software and firmware). For example, computing device(s) 104 may include central processing unit(s) (CPUs) 106 that execute instructions, neural processing unit(s) (NPUs) 108 that implement neural network (NN) models, NN applications that utilize one or more NN models, etc.

Server(s) 116 may comprise one or more computing devices, servers, services, local processes, remote machines, web services, etc. for providing NN training, models and/or content to computing device(s) 104. In an example, server(s) 116 may comprise a server located on an organization's premises and/or coupled to an organization's local network, a remotely located server, a cloud-based server (e.g., one or more servers in a distributed manner), or any other device or service that may host, manage, and/or provide NN training, models and/or content. Server(s) 116 may be implemented as a plurality of programs executed by one or more computing devices. Server programs and content may be distinguished by logic or functionality (e.g., as shown by example in FIG. 1).

Server(s) 116 may each include one or more model trainers 118, one or more NN models 120, and/or content 122. In some examples, computing device(s) 104 may include model trainer(s) 118, NN model(s) 120, and/or content 122, which may be developed on computing device(s) 104, downloaded from server(s) 116, etc.

Example NN computing environment 100 may operate at the edge or in an edge domain, referring to the edge or boundary of one or more networks in network(s) 114. Edge domain may include an end user device (e.g., computing device(s) 104), such as a laptop, mobile phone, and/or any IoT device (e.g., security camera).

Artificial intelligence (AI) neural network (NN) models (e.g., NN model(s) 120) may be used in many applications (e.g., NN application(s) 110), such as such as image classification and speech recognition applications. An AI NN model, referred to as a model, may represent an algorithm learned by a machine (e.g., machine learning (ML)). An algorithm/model may be trained. Model training may refer to a machine learning one or more parameters of an algorithm/model, for example, to improve performance of the algorithm/model. A trained model (e.g., NN model(s) 120) may be used for inference. For example, NN application(s) 110 may use a trained model (e.g., NN model(s) 120) to infer a classification (e.g., classify an image in content 122 as a person or a vehicle).

There may be one or more user experience (UX) scenarios on computing device(s) 104 that may rely on AI. Experiences driven by AI may involve creating and/or running algorithms without a human writer (e.g., a machine may train algorithms itself). Humans may (e.g., alternatively and/or in conjunction with AI) write programs or algorithms manually in software (e.g., C code) to perform tasks.

NN Application(s) 110 may pertain to a wide variety of AI applications, such as audio (e.g., noise suppression, spatial audio, speaker separation to distinguish between speakers), video (e.g., enhancement compression), speech (e.g., dictation, NTTS, voice access, translation), system health (e.g., security such as antivirus, battery usage, power usage), etc.

User(s) 102 may use computing device(s) 104 to run NN application(s) 110, which may, for example, allow user(s) 102 to browse server(s) 116 and/or select content 122. User(s) 102 may use computing device(s) 104, for example, to process content 120 (e.g., using NN model(s) 112*a*). Application(s) 110 may process (e.g., selected) content 122 using a trained model (e.g., among NN model(s) 120). An example of an NN application may be a pattern recognition application to identify objects (e.g., people, animals, plants) in image frames. User(s) 102 may use computing device(s) 104 to run NN application(s) 110, for example, to select, train or implement model(s) 120 (e.g., use models to infer classifications of content 120).

Model trainer(s) 118 may train and evaluate (e.g., generate) one or more models (e.g., NN model(s) 120) to improve performance of a hardware accelerator (e.g., neural processor) comprising hybrid or analog multiply and accumulate (MAC) processing elements (PEs). Model trainer(s) 118 may receive as input an original or modified form of content 122 generated by one or more computing devices (e.g., computing device(s) 104, server(s) 116). Model trainer(s) 118 may provide (e.g., manual and/or automated) labeling (e.g., pre-classification) of features (e.g., Ifmaps) for training content 122, for example, to produce a featurized training dataset with known labels. A training set may be split into a training set and a testing set. A training process may train a model with a training set. A trained model may be retrained, for example, as needed or periodically (e.g., with an expanded training set and/or Ifmaps).

Multiple models with multiple (e.g., different) feature sets may be trained (and evaluated). Various neural network models may be trained and evaluated, such as CNN and LSTM. A training process may utilize different settings to determine the best hyper parameters values. In an example of a neural network, parameter values may be determined for activation type, number of neurons in each layer, and the number of layers.

Trained NN model 120 may include, for example, a feature extractor, a feature transformer, and a classifier. A feature extractor may extract features from content 122. A feature transformer may transform extracted features into a format expected by a classifier. A feature transformer may, for example, convert the output of feature extractor into feature vectors expected by a classifier. A classifier may classify the extracted features as one or more classes. Classifier may generate an associated confidence level for a (e.g., each) classification (e.g., prediction).

Trained NN model 120 may receive as input an original or modified form of content 122 generated by one or more computing devices (e.g., computing device(s) 104 or server(s) 116). NN model(s) 120 may generate classifications based on inputs (e.g., Ifmaps) based on the training received from model trainer(s) 120. Classifications may include, for example, binary or multiclass classifications. Classifications may include or be accompanied by a confidence level, which may be based on a level of similarity to labels for one or more training set Ifmaps.

Trained NN model 120 may be saved (e.g., by model trainer(s)) 118) in a file. The file may be loaded into one or more devices (e.g., computing device(s) 104) to use the model (e.g., to infer). NN model 120 may interface to network(s) 114 for input (e.g., content 122) to generate results (e.g., by trained NN model 120 processing content 122). In an example, a NN model 120 may be trained to detect four classes based on training frames associated with training labels. For example, a deep neural network (DNN) may be tasked to understand what viewable objects (e.g., cat, dog, person, car) appear in content 122.

NN model 120 may be a DNN model. A convolutional neural network (CNN) may be a type of DNN. NN model(s) 120 may be implemented (e.g., in part) by hardware (HW). For example, a HW accelerator may accelerate computations for one or more CNN layers. HW used to implement an AI model (e.g., a HW accelerator) may have an (e.g., a significant) impact on the power efficiency of an AI model during inference on an edge device (e.g., a personal computer (PC)). Power efficiency and/or model accuracy may play a (e.g., significant) role in the performance of an AI model.

An example of a hardware accelerator that may be used implement one or more models is/(are) NPU(s) 108. For example, NN application(s) 110 (e.g., and/or operating system(s)) executed by CPU(s) 106 may utilize NPU(s) 108 to implement NN model(s) 120. Computing device(s) 104 may be a battery-operated device, such as a mobile phone. It may be important for NPU(s) 108 to implement NN model(s) 120 with less power to conserve energy stored in the device battery and/or in general to conserve energy. Energy conservation may depend on the implementation of NPU(s) 108. For example, NPU(s) 108 may include digital and/or hybrid or analog multiply and accumulate (MAC) processing elements (PEs).

Computational power efficiency may be important, given that AI compute demand may continue to increase exponentially year over year. Energy cost and/or memory access may be reduced, for example, by reducing data movement.

In some examples, a DNN (e.g., a CNN) may be implemented with a (e.g., highly) parallel computation architecture, such as single instruction, multiple data (SIMD), to provide high-throughput convolutions. Convolutions may dominate CNN runtime (e.g., convolutions may account for over 90% of CNN operations). Memory bandwidth may impact power efficiency and/or may cause a memory access bottleneck. For example, a (e.g., each) MAC operation may involve four memory accesses, which may lead to high energy consumption.

Figure 2:
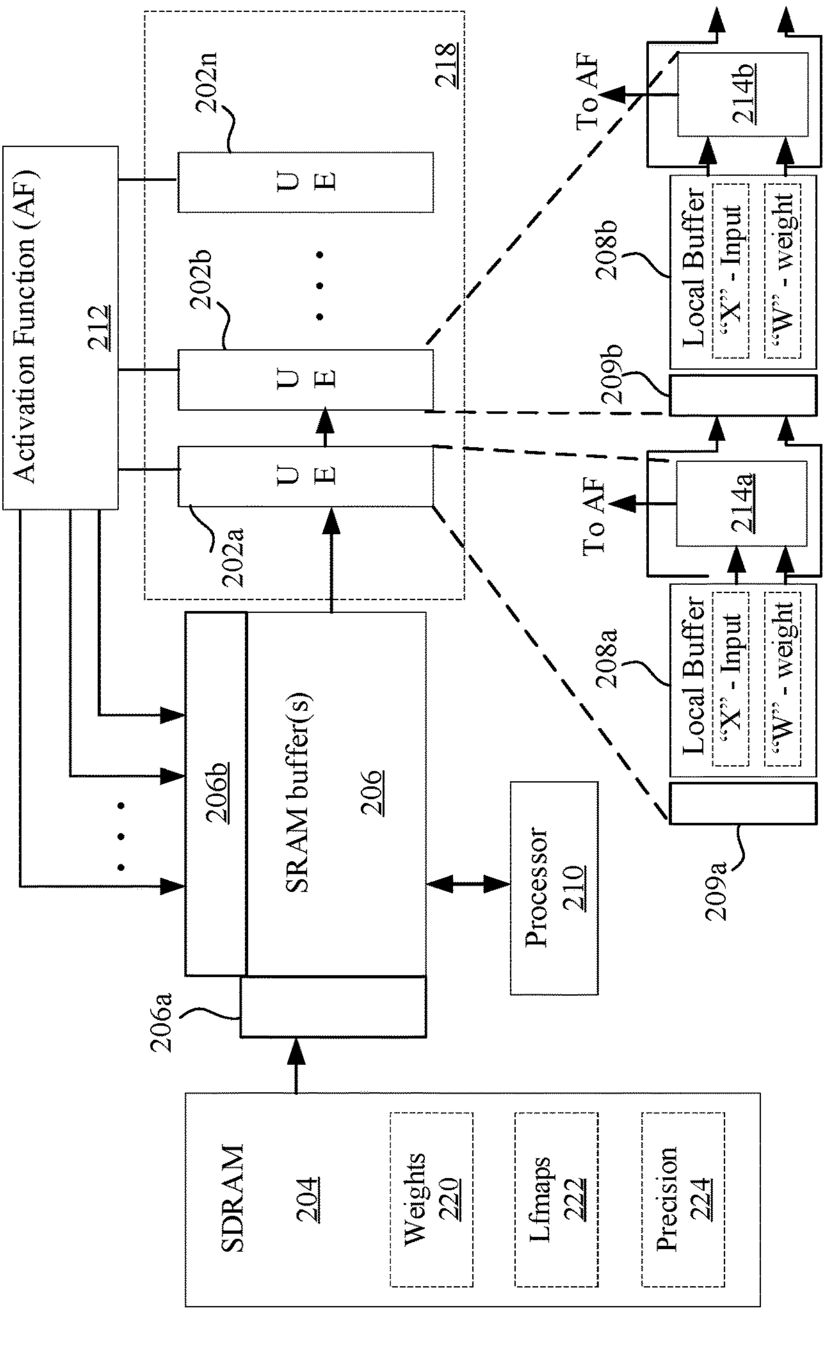
FIG. 2 shows a block diagram of a neural processing unit (NPU) with a systolic array architecture and row stationary data movement, according to an example embodiment.

FIG. 2 shows a block diagram of an example NPU 200 with a systolic array architecture and weight stationary data movement, according to an embodiment. Example NPU 200 presents one of many possible example configurations of NPU(s) 108 shown in FIG. 1. Example NPU 200 may be a DNN accelerator. Example NPU 200 shows a HW (hardware) accelerator (e.g., NPU(s) 108) implemented, with a MAC/AMAC circuit 218. NPU 200 may include, for example, MAC/AMAC circuit 218 (which includes a plurality of unit elements (UEs) 202*a-n*), one or more SRAM buffer(s) 206, a processor 210, and/or an activation function (AF) 212.

As shown in FIG. 2, a MAC/AMAC circuit 218 may include a systolic array of MAC PEs comprising UEs 202*a-n*. In some examples, a systolic array of MAC PEs may perform trillions of operations per second (TOPS). In one of many example implementations, a systolic array of PEs organized in clusters in a DNN hardware accelerator, e.g., with a weight-stationary data flow. A DNN HW accelerator may be configured and/or implemented to reduce energy cost and/or memory access. Data movements intimate convolutions performed by PEs in the systolic array. Data flow may be weight stationary (WS). A WS dataflow may improve (e.g., reduce) data-movements, for example, by (e.g., maximizing) usage of a storage hierarchy, which may include, for example, a low-cost register file (RF) and global buffer. A (e.g., each) PE may include or may be associated with (e.g., coupled to) an RF.

Example NPU 200 may implement a model with a digital, hybrid or analog MAC (AMAC) module such as a digital, analog or hybrid MAC circuit. A hybrid MAC circuit may include, for example, digital multiplication and analog accumulation. An AMAC (e.g., referring to analog and hybrid MACs) may be more power efficient than a digital MAC (DMAC) circuit.

One or more enhancements may be implemented to improve AMAC performance (e.g., accuracy, energy efficiency or power consumption). An AMAC may include an analog to digital converter, for example, to convert an analog accumulated signal to a digital signal. In some examples, an AMAC may be implemented with a successive approximation register (SAR) ADC. In some examples, an AMAC may be implemented with charge-sharing. One or more enhancements described herein may be implemented to improve AMAC performance, such as performance of an AMAC implemented with charge-sharing and/or a SAR-based ADC.

UEs 202*a-n* may include MAC/AMAC units 214*a-n*, local buffers 208*a-n*, and multiplexer (MUX) logic 209*a-n*. UEs 202*a-n* may perform (e.g., a large number of) multiply-accumulate (MAC) operations in parallel. Arithmetic operations may be fed new operands in each operational cycle using, for example, a memory hierarchy that exploits data-reuse opportunities. In some examples, there may be three levels of memory: external SDRAM 204, global SRAM buffer(s) 206 (e.g., SRAM global buffer(s) or double buffer(s)), and local buffers 208*a-n* (e.g., local buffers within each UE).

For example, during operations, as the filters slide across the input feature maps, the filters may be temporarily "cached" in SRAM buffer(s) 206 or within UE local buffers 208*a-n* (e.g., in a register file or flip-flops), which avoids reloading from external memory (e.g., SDRAM) 204 for each operation. Data reuse may support highly efficient power consumption, since accessing memory utilizes significantly more energy than arithmetic operations.

As shown in FIG. 2, the first UE local buffers (e.g., local buffer 208*a*) may be fed with input X and weight W from SRAM (e.g., global) buffer(s) 206, while inputs X and/or weights W for other UEs 202*a-n* may be shifted from neighboring UE local buffer(s) 208*a-n*.

In some examples, the output of UEs 202*a-n* may be fed through an activation function and then stored in SRAM buffer(s) 206 (e.g., for subsequent use as the input to the next processing cycle). In some examples, the output of UEs 202*a-n* may be stored in the global buffer (e.g., without passing through an output activation function), for example, for processing by processor 210. Processor 210 may include, for example, a microcontroller (uC), a central processing unit (CPU), a digital signal processor (DSP), and/or other type of processing circuit.

In some examples, data may flow between SDRAM 204, SRAM (e.g., global) buffer(s) 206 and UE local buffers 208*a-n*. In some examples, data may flow between UE local buffers 208*a-n*. For example, the data flow may be dynamically configured or statically pre-routed within MUX logic (e.g., SRAM buffer(s) MUX logic 206*a*, 206*b* and/or local buffer logic 209*a-n*) to reduce power consumption where data re-use occurs.

In some examples (e.g., with weights stationary), only the input (X) may move between UE local buffer(s) 208*a-n*. For example, weights may remain static (e.g., until the completion of tensor processing) after weights are loaded to each UE 202*a-n*.

A DNN may perform operations on an input activation (IA) vector (e.g., $IA_{x,y,z}$) (e.g., from a previous layer) with a filter represented by a weights vector (e.g., $W_{i,j,k}$), where i may range from 1 to N, producing an output activation (OA) vector (e.g., $OA_{x,y,n}$). A (e.g., each) PE may generate an output, for example, in accordance with Eq. (1):

$$PE(i)=Xi*Wi \quad \text{Eq. (1)}$$

An OA vector may be the total generated by multiple (e.g., all) PEs (e.g., PE[0] to PE[N−1]). The OA vector may be provided to the next layer (e.g., for additional operations). The OA vector may be stated, for example, in accordance with Eq. (2):

$$OA = \sum_{i=1}^{N} Xi * Wi \quad \text{Eq. (2)}$$

A digital MAC (DMAC) may perform operations to generate inner products (e.g., mid-terms) and to accumulate the multiple multiplication results utilizing OR gates or half adders, which may consume significant power. Performance of MAC operations with less power may significantly reduce total NPU power consumption based on the number of MACs and MAC operations. For example, a hybrid MAC with digital multiplication and analog accumulation may reduce MAC power consumption. In some examples, mid-terms of IA vectors and weight vectors may be calculated digitally while mid-terms may be accumulated (and summed) using analog charge sharing.

A (e.g., battery-powered) device (e.g., a smart phone) may run one or more models (e.g., DNNs). Analog computations may support low energy consumption for model inference computations. In some examples, a hybrid or analog MAC may perform (e.g., binary) multiplication using And gates (e.g., to generate multiple intermediate products). Intermediate products at the output of the And gates may be referred to as mid-terms. Summation of the products may be performed by charge sharing. Multiple mid-terms with the same weight may charge a capacitor. Capacitors may be coupled to respective wires in a charge collection bus according to bit position in the binary multiplication represented by the output of the And gates. The wires (e.g., and the charges accumulated on the wires) in the charge collection bus may be associated with weights relative to other wires based on bit position (e.g., LSB to MSB). The accumulated charges on the wires (e.g., from one or more charge capacitors in each of one or more PEs) may be combined (e.g., based on their respective weights) into a (e.g., single) charge representing the analog value (e.g., signal) of the multiplication. A summation of multiplication products from multiple PEs (e.g., sharing the weighted charge lines) may be referred to as a dot product. Convolution may be simplified into a dot product.

ADC power may consume a significant portion of the power consumed by a MAC/AMAC circuit. ADC power (e.g., in a SAR ADC) may be proportional to the number of ADC output bits. Each clock cycle of a SAR ADC may generate a bit. A first cycle may output the MSB and successive cycles may generate less significant bits. Training and/or observation may determine that not all bits are needed (e.g., not all bits are effective bits) for one or more inputs or operations. A model (e.g., DNN) may have many (e.g., millions) of parameters, coefficients or weights, which may be trained to specific values. The computation graph or DNN may have many (e.g., millions of) nodes or multipliers with many (e.g., tens of thousands of) dot products. Not all dot products require the same level of precision. The dynamic range (e.g., maximum number of effective bits) for a specific node of a computation graph in a DNN may be determined. For example, some nodes may have a smaller dynamic range than other nodes. The precision needed at various nodes to maintain the overall accuracy of the model (e.g., algorithm) may vary. For example, an observation may be made that one or more particular bits in particular nodes are always zero.

For example, it may be determined that only three (3) of five (5) bits may be "effective" and two (2) bits may be "defective." Knowledge of the number of effective bits may be used to selectively reduce the number of cycles of an ADC (e.g., SAR ADC), which may reduce power consumption by each of potentially many ADCs. One or more parameters may (e.g., also) be dynamically adjusted in association with dynamically adjusting the number of ADC cycles. Control logic may automatically adjust the number of clock cycles, for example, based on one or more inputs, such as a precision control signal (e.g., Y effective precision for a dot product). A precision control signal (e.g., Y effective precision) may be determined, for example, from training A training process may learn the effective number of bits for ADC output for a given input. The effective number of bits may be stored, loaded during inference, and used to dynamically control ADC cycles.

As shown in FIG. 2, precision 224 may represent accuracy information developed during model training Accuracy information, such as expected intermediate quantization (e.g., the number of useful bits at ADC output) may be saved, for example, in a model file, which may be loaded into an NPU for AI model operation.

Precision 224 may be used to control NPU operation to conserve power. NPU power efficiency may be improved by controlling operation of analog circuitry (e.g., by controlling ADC operation). MAC power consumption (e.g., by ADC components) may be improved, for example, by dynamically controlling (e.g., reducing) ADC clock cycles to avoid power consumption for cycling the ADC beyond accuracy of ADC output. Accuracy information may be developed during training or inference (e.g., by observation). Precision 208 may be an input to control logic (e.g., a controller) to dynamically adjust output. For example, the controller may dynamically adjust the number of clock cycles of an ADC to dynamically control the precision output by the ADC (e.g., SAR ADC).

Figure 3:
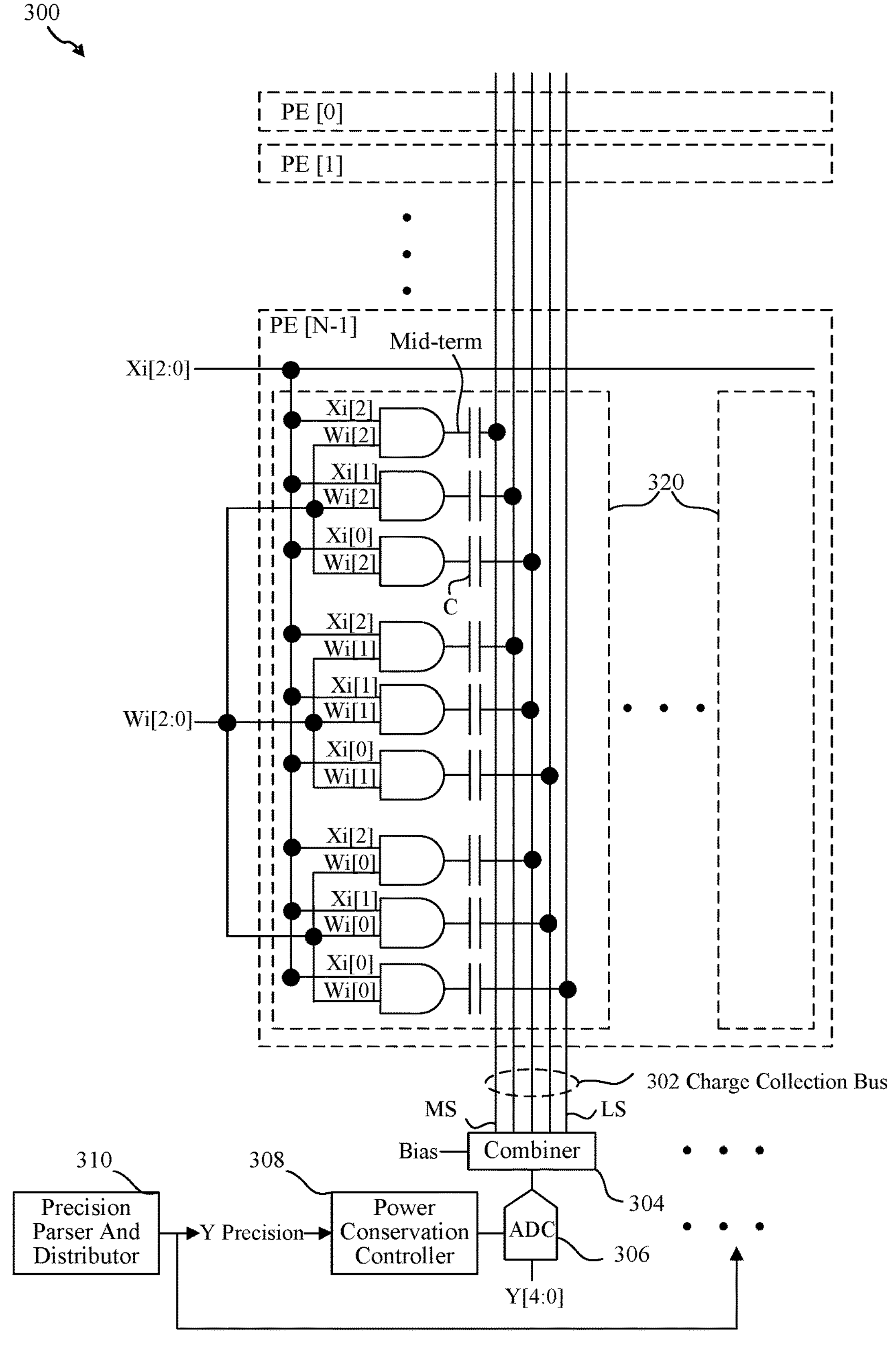
FIG. 3 shows a block diagram of a processing array with hybrid multiply and accumulate (MAC) processing elements (PEs), according to an example embodiment.

FIG. 3 shows a block diagram of an example of a MAC circuit 300 with hybrid MAC PEs, according to an example embodiment. Example MAC circuit 300 presents one of many possible example configurations of MAC circuit 218 shown in FIG. 2.

Example MAC circuit 300 includes N processing elements (e.g., PE[0] to PE[N−1]) coupled to (e.g., weighted) charge collection bus 302. PEs may include a plurality of UEs 320 (e.g., UEs 202*a-n* shown in FIG. 2). The charge-sharing hybrid (digital-analog) MAC architecture shown in FIG. 3 may (e.g., significantly) reduce MAC power consumption by splitting multiply and accumulate operations between digital and analog domains. For example (e.g., for a 12 nm Fin-Fet process), an approximately 10 TMAC NPU 4-bit analog MAC architecture compared to an approximately 10 TMAC NPU 4-bit digital MAC architecture may increase area by approximately two (2) square millimeters while decreasing power consumption by nearly one (1) Watt.

As shown by example in FIG. 3, mid-terms may be calculated by digital circuitry (e.g., AND gates) configured to multiply input Xi[2:0] by weights Wi[2:0]. Mid-terms may be accumulated by analog circuitry. For example, mid-term outputs of the digital circuitry may charge (e.g., relatively small) charge accumulation capacitors C coupled to charge collection lines in charge collection bus 302. Charge accumulation capacitors C may have (e.g., significantly) reduced $C_{load}$. In an example implementation, a value of charge accumulation capacitors C may be 0.5 femto Farads (fF) (e.g., for a 12 nm Fin-Fet process).

Mid-term summation may be calculated based on a charge-sharing concept. A charge for each mid-term result may be transferred from the digital multiplication to a (e.g., global) charge collection line (e.g., metal bit line). Mid-terms with the same "weight" may be coupled to the same charge collection line. The accumulation of multiple mid-terms with the same "weight" may be performed by (e.g., passively) accumulating their charges on the same metal bit line. Passive accumulation may conserve energy because passive accumulation does not consume energy. Mid-terms on a charge collection line representing a smaller weight (e.g., least significant (LS) charge collection line) may have less value than mid-terms on charge collection lines representing higher weights (e.g., most significant (MS) charge collection line).

Charges on the charge collection lines in charge collection bus 302 may be summed together, for example, by combiner 304. Charges on the bit lines may be weighted and/or by circuitry in combiner 304. Weights may be implemented, for example, in charge lines, in capacitor values, and/or in combiner 304. Combiner 304 may include passive and/or active circuitry. In some examples, combiner 304 may perform a weighted charge summation. Charges on each bit line may be accumulated with charges on other bit lines through one or more voltage dividers (e.g., resistive or capacitive dividers). For example, the charge on each bit line may be accumulated with charges on other bit lines through a capacitance value corresponding to the weight of the bit line (e.g., each charge collection line may be coupled to a capacitor with a different value). For example, an MSB line may not have a resistor while other lines may have increasing values of resistors to reduce their relative weights by a resistive or capacitive divider.

ADC 306 may convert the total combined or summed charge generated by combiner 304 into a digital representation (e.g., Y[4:0]). Combiner 304 may be controlled or calibrated (e.g., at least in part) by a bias input. The bias may be fixed or variable. Inputs may be normalized, for example, to maintain values within the dynamic range of ADC 306.

As shown in FIG. 2, charge collection bus 304 may be coupled to (e.g., and may accumulate charges from) each of multiple PEs (e.g., PE[0] through PE [N−1]).

Charge collection bus 302 may be shared by multiple PEs. Each of multiple PEs may couple multiplication product charges to shared charge collection bus 302. Charge summation by combiner 304 and digital conversion by ADC 306 may be performed on a (e.g., single) multiplication result from a (e.g., single) PE. Charge summation by combiner 304 and digital conversion by ADC 306 may be performed on multiple multiplication results from each of multiple MAC PEs coupled to the same bit lines. Digital representation (e.g., Y[4:0]) may represent summation of multiple PE products. Digital representation (e.g., Y[4:0]) may be referred to as a dot product.

ADC 306 may or may not be used to convert partial summation (PSum) results. In some examples, ADC 306 may convert the (e.g., entire) dot product operation (e.g., using the relevant inputs, such as pixels, and channels of the input data and filters, such as weights, that may be used to calculate an output pixel).

In an example (e.g., as shown in FIG. 3), there may be two three-bit vectors IA[2:0] and W[2:0], which may be multiplied and accumulated. Multiplication results may be indicated by mid-terms. Mid-terms may be accumulated on weighted charge lines (e.g., five charge lines of charge collection bus 302). The accumulated mid-term charges may be accumulated into a single charge by combiner 304. The single charge may be converted into a digital value by ADC 306. A least significant (LS) charge line may have a weight of 1 while a second charge line may have a weight of 2, a third weighted at 4, a fourth weighted at 8, a fifth (e.g., most significant (MS) line) weighted at 16, etc. An example of digital multiplication and weighted analog accumulation is shown below:

$$1*(IA[0]*W[0])+2*(IA[1]*W[0]+IA[0]*W[1])+4*(IA[2]*W[0]+IA[1]*W[1]+IA[0]*W[2])+8*(IA[2]*W[1]+IA[1]*W[2])+16*(IA[2]*W[2])$$

Combiner 304 may combine charges on the charge lines according to these weights. Many other weights may be implemented, e.g., LS line at 1/32, second line at 1/16, third at 1/8, fourth at 1/4, fifth (e.g., MS line) at 1/2, etc. ADC 306 may convert the combined charge into output Y[4:0].

One or more operating characteristics of a hybrid or analog MAC may be leveraged to improve performance (e.g., reduce power consumption). Performance improvements described herein may apply to MAC architectures and/or other analog computation circuitry. Several operating characteristics of a hybrid (e.g., digital-analog) MAC or AMAC architecture may be observed. Charging power in a hybrid MAC or AMAC architecture may be proportional to the entropy of the data (e.g., proportional to the number of mid-terms with a value of 1, where zeros have no power "cost"). In other words, power consumption of an AMAC may be proportional to the number of non-zero bits at the output of the mid-terms (e.g., input to the charge capacitors C). Charge on charge capacitors C may be proportional to the number of non-zero bits. Power consumption of a hybrid or analog MAC may be proportional to the number of bits at the output of the ADC. SAR ADC power may be proportional to the number of conversions (e.g., cycles).

NPU power efficiency may be improved by controlling operation of MAC circuitry (e.g., by controlling ADC operation). MAC control logic, such as ADC control logic, may reduce MAC power consumption, and thereby reduce NPU power consumption. Power conservation controller (e.g., or precision controller) 308 may (e.g., be configured to) control ADC 306 to conserve power, e.g., as may be permitted during operation. For example, power conservation controller 308 may conserve power by varying ADC precision (e.g., based on precision information determined during training).

Accuracy information may be determined during training Accuracy information, such as expected intermediate quantization (e.g., the number of useful bits at MAC output) may be saved, for example, in a model file, which may be loaded into an NPU for AI model operation (e.g., precision 224). Y effective precision during inference operation by a model may be determined from precision information identified during training of the model.

Y effective precision (e.g., precision 224) may be an input to control logic (e.g., power conservation controller 308) to support dynamic adjustment of MAC output precision. Power conservation controller 308 may dynamically determine and/or dynamically receive (e.g., based on input Y precision) the effective number of bits (e.g., precision) for an operation and may dynamically control ADC 306 accordingly (e.g., to reduce power consumption by avoiding unnecessary ADC operation). Y precision may represent the output precision of a dot product node. For example, the controller may dynamically adjust the number of clock cycles of an ADC (e.g., a SAR ADC) to dynamically control the precision output by the ADC. MAC power consumption (e.g., by ADC components) may be improved, for example, by dynamically controlling (e.g., reducing) ADC clock cycles to avoid power consumption for cycling the ADC beyond accuracy of ADC output.

In an example, the Y precision signal may indicate to power conservation controller 308 and/or power conservation controller 308 may determine based on the Y precision signal, that the output precision of ADC for given Ifmaps 222 and/or weights 220 and/or for given image row 3 and/or weight row 3 (e.g., Xi[2:0] and/or Wi[2:0]) may be three (3) bits (e.g., Y[2:0]) rather than five bits (e.g., Y[4:0]). Power conservation controller 308 may reduce the number of clock cycles of ADC 306 to generate three-bit precision Y[2:0], thereby avoiding consumption of energy for two additional clock cycles of ADC 306. This conservation of energy may occur for one or more operations of one or more (e.g., many) MAC PEs (e.g., hundreds, thousands, millions) for one or more layers (e.g., 50 layers), thereby (e.g., substantially) reducing power consumption of an NPU to implement model operation.

Precision parser and distributor 310 may parse precision information 208 (e.g., in cache 202) and dynamically provide Y precision to each of one or more power conservation controllers 308 in MAC circuit 300 (e.g., MAC circuit 218). Precision parser and distributor 310 may be a component of the model inference engine. For example, a model inference engine may pass Y node (e.g., dot product node) accuracy information to respective Y nodes for use to control ADC cycles.

Figure 4:
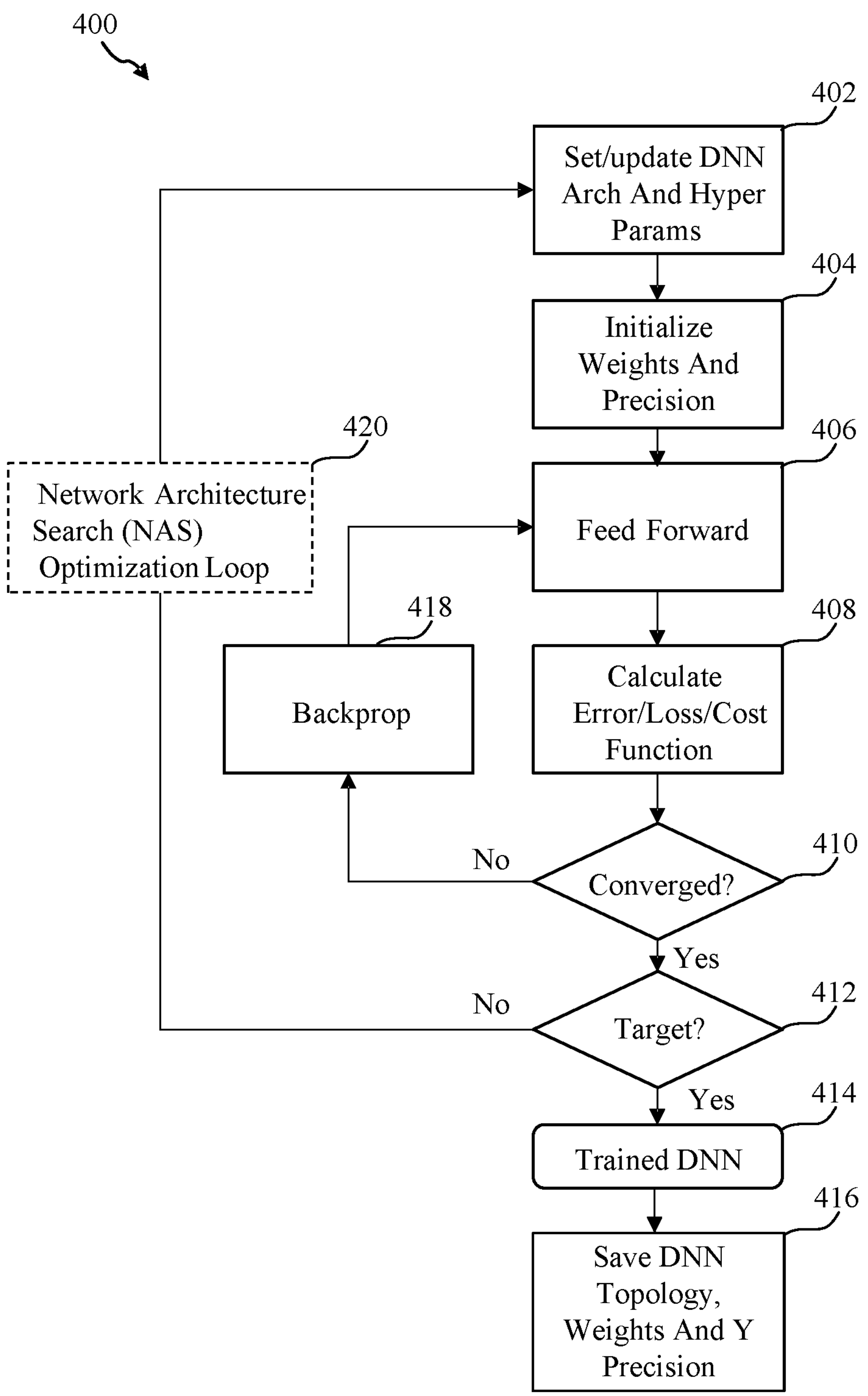
FIG. 4 shows a flowchart of a method for model training, detection and storage of precision information, according to an example embodiment.

FIG. 4 shows a flowchart of an example of a method 400 for model training, detection and storage of precision information, according to an example embodiment. Example training method 400 presents one of many possible example methods of model trainer(s) 118 training NN model(s) 120. Embodiments disclosed herein and other embodiments may operate in accordance with example training method 400. Example training method 400 comprises steps 402-420. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. Embodiments may implement fewer, more or different steps.

As shown in FIG. 4, in step 402, a model architecture and hyper parameters may be selected and/or updated for a (e.g., DNN) model. For example, as shown in FIG. 1, user(s) 102 and/or model trainer(s) 118 may select or update a model architecture and hyper parameters for a (e.g., DNN) model (e.g., NN model(s) 122). A model architecture may be selected by selecting a topology of a neural network. A topology may be a computational graph of multiplication, summation and connectivity.

In step 404, weights (e.g., X, W input bit width) and MAC precision may be initialized. For example, as shown in FIGS. 1-3, user(s) 102 and/or model trainer(s) 118 may initialize weights 220 and MAC precision 224 for a (e.g., DNN) model (e.g., NN model(s) 122). For example, AMAC node precision may be initialized with maximum precision values, mixed precision values, random precision values, etc.

In step 406, the model (e.g., with initialize values) may be run in a feed forward path to (e.g., iteratively) develop the model weights, precision, etc. based on training data, including determining precision information. For example, as shown in FIGS. 1-3, model trainer(s) 118 may train NN model 120 with training data input as Ifmaps 222 and revise weights 220 and precision 224 accordingly to improve the accuracy of NN model 120 based on labels in Ifmaps 222.

In step 408, error, loss and/or cost functions may be evaluated. For example, as shown in FIGS. 1-3, model trainer(s) 118 may evaluate error, loss and/or cost functions with respect to the performance of NN model 120 as it may be configured at a certain stage of training.

In step 410, a determination may be made whether the model in training has reached convergence. For example, as shown in FIGS. 1-3, model trainer(s) 118 may determine (e.g., based on the error, loss and/or cost function evaluation) whether additional training may or may not improve NN model 120. A model (e.g., DNN) may be trained, for example, when weights are converged with accurate target labels. Convergence may be reached by model training, for example, if error, loss and/or cost functions settle to within a (e.g., predetermined) range of acceptable final values.

In step 412, a determination may be made whether the model in training has reached a target if the trained model has converged. For example, as shown in FIGS. 1-3, model trainer(s) 118 may determine (e.g., if the model has converged) whether the trained model has reached or achieved one or more targets (e.g., precision).

In step 414, the model may be deemed trained if the model achieves one or more targets. For example, as shown in FIGS. 1-3, model trainer(s) 118 may determine NN model 120 to be trained completely based on determinations that NN model 120 converged and achieved one or more (e.g., specified) targets.

In step 416, DNN topology, weight values and accuracy information (e.g., Y precision) may be stored. For example, as shown in FIGS. 1-3, model trainer(s) 118 may store the topology of NN model 120, store weights 220 and store precision 224 in one or more files (e.g., for subsequent loading and use when NN application(s) 110 utilizes NN model 120 for inference).

Y effective precision may be monitored, determined and/or saved throughout training on multiple training input frames (e.g., training Ifmaps) to capture the dynamic range for the multiple frame inputs (e.g., over the whole training dataset). The precision information may be applied for numerous frames processed during inference by the trained model to provide dynamic control of ADC cycles, for example, by monitoring and storing the precision (e.g., effective number of bits) for many frames.

In step 418, back propagation (backprop) may be performed if the trained model is determined at step 410 to not be converged and return to step 406 following backprop. For example, as shown in FIGS. 1-3, model trainer(s) 118 may perform backprop on NN model 120 if the trained model is determined at step 410 to not be converged and return to step 406. Backprop may reduce error, loss and/or cost functions in an attempt to converge (e.g., while maintaining model precision). For example, an image from a dataset may be run through the computational graph (e.g., DNN). The results may be compared to a ground truth (e.g., labels). Error may be measured or calculated based on the difference between the results and labels. If the error is unsatisfactory, back propagation may be performed to propagate the error backwards (e.g., in reverse direction on the computational graph) to determine (e.g., learn) how the error may be created or affected by the weight values. One or more weight values in the DNN may be adjusted to reduce (e.g., minimize) the error.

In step 420, a network architecture search (NAS) improvement loop may be engaged if the model was determined to be converged at step 410 but determined to have failed to achieve one or more targets at step 412. For example, as shown in FIGS. 1-3, model trainer(s) 118 may perform the NAS improvement loop on NN model 120 if the model was determined to be converged at step 410 but determined to have failed to achieve one or more targets at step 412. Model trainer(s) 118 may return to step 402. For example, if NN model 120 is converged but a target is not achieved an attempt may be made to adjust the topology and/or hyper parameters, such as the number of layers, number of neurons, activation function(s), enhancer (e.g., improver, optimizer), learning rate, batch size, epochs, number of processing elements N summed together per MAC circuit (e.g., 64, 128, 512 based on vector length), and so on.

Figures 5, 6:
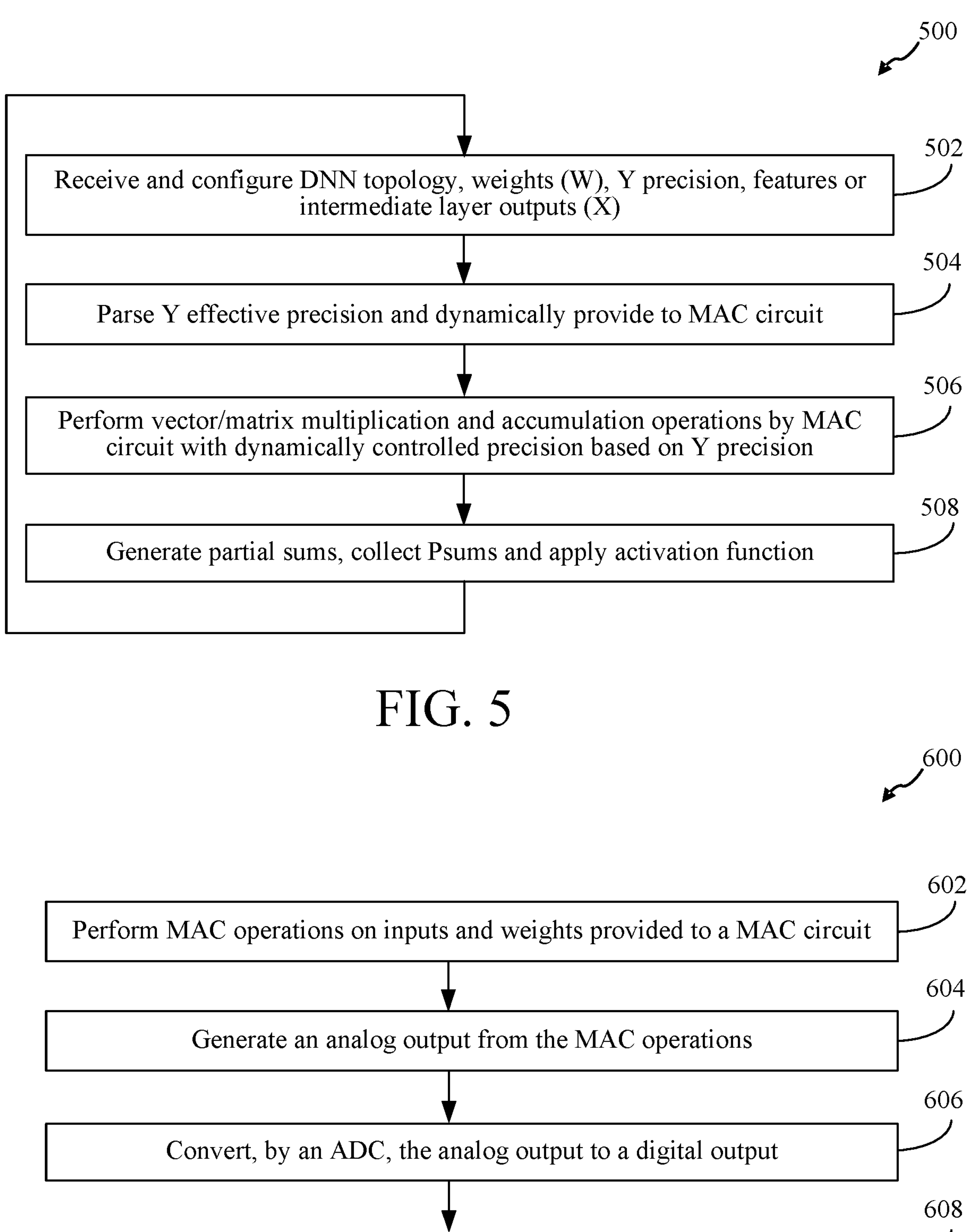
FIG. 5 shows a flowchart of a method for using a trained model during inference to improve performance of a hardware accelerator comprising hybrid or analog MAC PEs, according to an example embodiment.
FIG. 6 shows a flowchart of a method for improving performance of a hardware accelerator comprising hybrid or analog MAC PEs, according to an example embodiment.

FIG. 5 shows a flowchart of a method 500 for using a trained model during inference to improve performance (e.g., reducing power consumption) of a hardware accelerator (e.g., neural processor) comprising hybrid or analog MAC PEs, according to an example embodiment. Embodiments disclosed herein and other embodiments may operate in accordance with example method 500. Method 500 comprises steps 502-508. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

As shown in FIG. 5, in step 502, DNN topology, weights (W), Y precision, features or intermediate layer outputs (X) may be received and configured. For example, as shown in FIGS. 1-3, computing device(s) 104 may receive from server(s) 116 (e.g., based on a request by NN application(s) 110), NN model(s) 120 in the form of DNN topology, weights (W), Y precision, features or intermediate layer outputs (X). NN application(s) 110 may configure the DNN model according to received DNN topology, weights (W), Y precision, features or intermediate layer outputs (X). For example, a topology file with parameters (e.g., converged weights) in a file may be loaded and executed to infer object labels for new image frames with one or more objects.

In step 504, Y effective precision may be parsed and dynamically provided to the MAC circuit. For example, as shown in FIGS. 1-3, NN model 120 (e.g., precision parser and distributor 310) may parse precision information 208 in cache 202 and dynamically provide Y precision to each of one or more power conservation controllers 308 in MAC circuit 300.

In step 506, vector/matrix multiplication and accumulation operations may be performed by a MAC circuit with dynamically controlled precision based on Y precision. For example, as shown in FIGS. 1-3, MAC circuit 300 may perform vector/matrix multiplication and accumulation operations with ADC output precision being dynamically controlled based on dynamically provided Y precision.

In step 508, partial sums may be generated and collected and an output activation function may be applied. For example, as shown in FIGS. 1-3, MAC circuit 218 may generate Psums, Psum handler 212 may collect and store Psums in output Fmap and Psum memory, and NN model 120 may apply the output activation function to the stored Psums.

FIG. 6 shows a flowchart of a method 600 for improving performance (e.g., reducing power consumption) of a hardware accelerator (e.g., neural processor) comprising hybrid or analog MAC PEs, according to an example embodiment. Embodiments disclosed herein and other embodiments may operate in accordance with example method 600. Method 600 comprises steps 602-608. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

As shown in FIG. 6, in step 602, MAC operations may be performed on inputs and weights provided to a MAC circuit. For example, as shown in FIGS. 1-3, MAC circuit 218 or 300 may perform multiply and accumulate operations on respective input Ifmaps (X) and weights (W).

As shown in FIG. 6, in step 604, an analog output may be generated from the MAC operations. For example, as shown in FIGS. 1-3, charge collection bus 302 may accumulate charges from multiplication products while combiner 304 may combine the charges weighted based on their significance into an analog output provided to ADC 306.

As shown in FIG. 6, in step 606, an ADC may convert the analog output to a digital output. For example, as shown in FIGS. 1-3, ADC 306 may convert the analog output received from combiner 304 into a digital output Y[4:0].

As shown in FIG. 6, in step 608, power consumption of the MAC circuit may be reduced by dynamically adjusting a precision of the digital output. For example, as shown in FIGS. 1-3, precision parser and distributor 310 may parse precision information 208 in cache 202 and dynamically provide Y precision to each of one or more power conservation controllers 308 in MAC circuit 300. Power conservation controller 308 may reduce power consumption of MAC circuit 300 by dynamically adjusting a precision of the digital output. For example, power conservation controller 308 may control (e.g., selectively reduce) the number of clock cycles to ADC 306 for MAC operations based on Y precision. Avoidance of unnecessary ADC cycles may conserve power.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
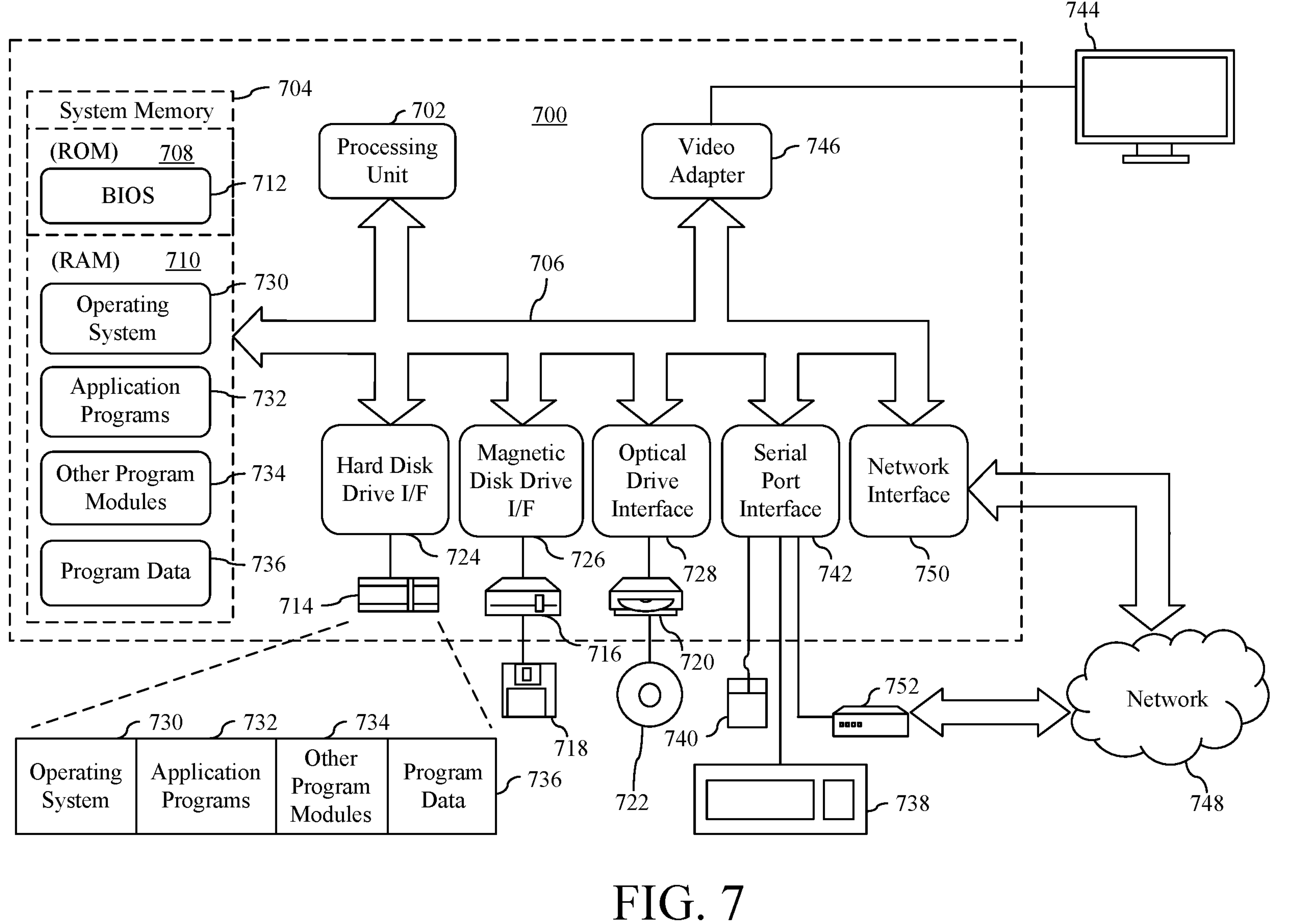
FIG. 7 shows a block diagram of an example computing device that may be used to implement example embodiments.

FIG. 7 shows an exemplary implementation of a computing device 700 in which example embodiments may be implemented. Consistent with all other descriptions provided herein, the description of computing device 700 is a non-limiting example for purposes of illustration. Example embodiments may be implemented in other types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for analog MAC-aware DNN improvement (e.g., an increase or even optimization of performance). In examples, an NPU may be configured to implement an AI NN model. The NPU may comprise at least one MAC circuit. A MAC circuit may include a plurality of MAC PEs. MAC PEs may include a multiplier (e.g., configured to perform multiplication operations on inputs and weights to generate mid-term values) and an accumulator configured to accumulate the mid-term values as an analog output. A MAC circuit may include an ADC configured to convert the analog output to a digital output. A MAC circuit may include a power conservation controller configured to selectively vary (e.g., dynamically adjust) a precision of the digital output (e.g., dot product), which may (e.g., thereby) selectively (e.g., dynamically) reduce power consumption of the MAC circuit. The selectivity enables a reduction of power consumption when higher computation precision is not necessary or desired, while enabling higher computation precision to be selected as desired.

In examples, the ADC may comprise a SAR ADC. The power conservation controller may be configured to selectively vary the number of cycles of the SAR ADC, for example, to selectively vary the effective number of bits generated by the SAR ADC.

In examples, the power conservation controller may be configured to receive a precision indication. The power conservation controller may be configured to selectively vary the precision of the digital output based on the precision indication.

In examples, the NPU may include a memory storing bit precision information, which may be determined during training or quantization of the AI NN model. The NPU may include a precision determiner configured to dynamically determine the precision indication based on the (e.g., stored)

bit precision information. The stored bit precision information may be referenced for the precision indication to enable a power savings benefit while not degrading output accuracy in a way that causes a performance degradation.

In examples, the bit precision information may include a dynamic range of precision determined for each of a plurality of input frames of a dataset for each of a plurality of nodes of a computation graph for the AI NN.

In examples, the precision determiner may dynamically vary the precision indication (e.g., for each of a plurality of nodes of a computation graph for the AI NN) based on at least one of the inputs or the weights mapped to the bit precision information for a node in the plurality of nodes of a computation graph for the AI NN.

In examples, the power conservation controller may be configured to dynamically adjust at least one parameter of a MAC PE in association with selectively varying the precision of the digital output for the MAC PE.

In examples, the plurality of MAC PEs may comprise a plurality of hybrid MAC PEs with digital multipliers that generate the (e.g., digital) mid-term values.

In examples, a method of improving implementation of an AI NN model may comprise, for example, performing MAC operations on inputs and weights provided to a MAC circuit; generating an analog output from the MAC operations; converting (e.g., by ADC) the analog output to a digital output; and reducing power consumption of the MAC circuit by dynamically adjusting a precision of the digital output (e.g., dot product).

In examples, the dynamic variation of the precision of the digital output may comprise dynamically adjusting a number of cycles of the ADC to dynamically vary the effective number of bits generated by the ADC.

In examples, the method may (e.g., further) comprise, receiving a precision indication; and dynamically adjusting the precision of the digital output based on the precision indication.

In examples, the method may (e.g., further) comprise determining the precision indication based on precision information determined during training or improvement (including an increase or even optimization of performance) of the AI NN model.

In examples, the precision information may comprise a dynamic range of precision determined for each of a plurality of input frames of a dataset for each of a plurality of nodes of a computation graph for the AI NN.

In examples, the determination of the precision indication may comprises determining the precision indication (e.g., for each of a plurality of nodes of a computation graph for the AI NN) by mapping at least one of the inputs or the weights to the precision information for a node in the plurality of nodes of a computation graph for the AI NN.

In examples, the method may (e.g., further) comprise dynamically adjusting at least one parameter of a MAC PE in association with selectively varying the precision of the digital output for the MAC PE.

In examples, performing the MAC operations may comprise generating digital mid-terms; and performing analog accumulation of the mid-terms to generate the analog output.

In examples, a system may comprise one or more memory devices and an NPU. The one or more memory devices may store, for example, a DNN topology, weights and dot product precision values. The DNN may include at least one MAC circuit. The MAC circuit may comprise a plurality of MAC PEs, an ADC and a controller. A (e.g., each) MAC PE may be configured to generate an analog output from multiply and accumulation operations on inputs and weights. The ADC may be configured to convert the analog output to a dot product. The controller may be configured to dynamically vary a precision of the dot product based on the dot product precision values.

In examples, the ADC may comprise a SAR ADC. The dynamic variation of the precision of the dot product may comprise dynamically varying the number of cycles of the ADC, for example, to dynamically vary the effective number of bits generated by the ADC for the dot product.

In examples, a precision determiner may be configured to dynamically provide the dot product precision values to the controller based on at least one of the inputs or the weights.

In examples, the NPU may (e.g., be configured to) determine the dot product precision values during training of the DNN.

V. Conclusion

While various examples have been described above, it should be understood that they have been presented by way of example only, and not limitation. It will be understood by those skilled in the relevant art(s) that various changes in form and details may be made therein without departing from the spirit and scope of the present subject matter as defined in the appended claims. Accordingly, the breadth and scope of the present subject matter should not be limited by any of the above-described examples, but should be defined only in accordance with the following claims and their equivalents.

What is claimed is:

1. A neural processing unit (NPU), comprising:

a memory storing bit precision information determined during at least one of training or quantization of a neural network model;

a precision determiner configured to dynamically determine a precision indication based on the bit precision information; and a power conservation controller configured to selectively vary a precision of a digital output based on the precision indication, the selective variation of the precision of the digital output reducing power consumption of the NPU.

2. The NPU of claim 1, further comprising:

an analog to digital converter (ADC) configured to convert an analog output to the digital output, the power conservation controller configured to control the ADC to selectively vary the precision of the digital output based on the precision indication.

3. The NPU of claim 2, wherein the power conservation controller is configured to perform at least one of:

dynamically determine from the precision indication an effective number of bits for an operation; or dynamically receive in the precision indication the effective number of bits for the operation.

4. The NPU of claim 2, wherein the precision indication comprises an output precision of a dot product node.

5. The NPU of claim 2, wherein the power conservation controller is configured to dynamically adjust a number of clock cycles of the ADC to dynamically control a bit precision of the digital output of the ADC.

6. The NPU of claim 2, wherein the ADC is a serial approximation register (SAR) ADC.

7. The NPU of claim 2, further comprising:

a multiply and accumulate (MAC) circuit that generates the analog output.

8. The NPU of claim 7, wherein the precision indication determined by the precision determiner is received by a plurality of the power conservation controllers that receive analog outputs from a corresponding plurality of MAC circuits of the NPU.

9. A neural processing unit (NPU) configured to implement a neural network (NN) model, the NPU comprising:

a precision parser and distributor configured to dynamically determine a precision indication based on bit precision information determined during at least one of training or quantization of the neural network model; and a power conservation controller configured to selectively vary a precision of a digital output based on the precision indication, the selective variation of the precision of the digital output reducing power consumption of the NPU.

10. The NPU of claim 9, further comprising:

an analog to digital converter (ADC) configured to convert an analog output to the digital output, the power conservation controller configured to control the ADC to selectively vary the precision of the digital output based on the precision indication.

11. The NPU of claim 10, wherein the power conservation controller is configured to perform at least one of:

dynamically determine from the precision indication an effective number of bits for an operation; or dynamically receive in the precision indication the effective number of bits for the operation.

12. The NPU of claim 10, wherein the precision indication comprises an output precision of a dot product node.

13. The NPU of claim 10, wherein the power conservation controller is configured to dynamically adjust a number of clock cycles of the ADC to dynamically control a bit precision of the digital output of the ADC.

14. The NPU of claim 10, wherein the ADC is a serial approximation register (SAR) ADC.

15. The NPU of claim 10, further comprising:

a multiply and accumulate (MAC) circuit that generates the analog output.

16. The NPU of claim 15, wherein the precision indication determined by the precision parser and distributor is received by a plurality of the power conservation controllers that receive analog outputs from a corresponding plurality of MAC circuits of the NPU.

17. A method in a neural processing unit (NPU), the method comprising:

determining a precision indication based on precision information determined during training or improvement of the AI NN model; and reducing power consumption of the MAC circuit by dynamically adjusting a precision of the digital output based on the precision indication.

18. The method of claim 17, further comprising:

converting the analog output to a digital output by an analog to digital converter (ADC); and controlling the ADC to selectively vary the precision of the digital output based on the precision indication.

19. The method of claim 18, wherein said determining comprises at least one of:

dynamically determining from the precision indication an effective number of bits for an operation; or dynamically receiving in the precision indication the effective number of bits for the operation.

20. The method of claim 18, wherein said controlling comprises:

dynamically adjusting a number of clock cycles of the ADC to dynamically control a bit precision of the digital output of the ADC.

* * * * *